(12) United States Patent
Xiao et al.

(10) Patent No.: US 11,703,469 B2
(45) Date of Patent: Jul. 18, 2023

(54) RAPID EVALUATION METHOD FOR QUALITY OF LIGNIN-PYROLYZED BIO-OIL BASED ON RADICAL DETECTION AND APPLICATION THEREOF

(71) Applicant: SOUTHEAST UNIVERSITY, Jiangsu (CN)

(72) Inventors: Rui Xiao, Jiangsu (CN); Yuyang Fan, Jiangsu (CN); Chao Liu, Jiangsu (CN); Ming Lei, Jiangsu (CN); Xiangchen Kong, Jiangsu (CN); Weicong Xu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/008,722

(22) PCT Filed: Oct. 13, 2021

(86) PCT No.: PCT/CN2021/123435
§ 371 (c)(1),
(2) Date: Dec. 7, 2022

(87) PCT Pub. No.: WO2022/142585
PCT Pub. Date: Jul. 7, 2022

(65) Prior Publication Data
US 2023/0194449 A1 Jun. 22, 2023

(30) Foreign Application Priority Data
Dec. 30, 2020 (CN) .......................... 202011615660.2

(51) Int. Cl.
G01N 24/10 (2006.01)
C10G 1/00 (2006.01)

(52) U.S. Cl.
CPC ............ G01N 24/10 (2013.01); C10G 1/002 (2013.01); C10G 2300/1014 (2013.01); C10G 2300/201 (2013.01)

(58) Field of Classification Search
CPC .................... G01N 24/10; C10G 1/002; C10G 2300/1014; C10G 2300/201
See application file for complete search history.

(56) References Cited

U.S. PATENT DOCUMENTS

| | | | |
|---|---|---|---|
| 9,453,166 B2 * | 9/2016 | Huber | C07C 45/49 |
| 2008/0227673 A1 | 9/2008 | Kushch | |
| 2019/0233751 A1 * | 8/2019 | Medoff | C10G 3/47 |
| 2020/0255572 A1 * | 8/2020 | Cochran | C08J 11/12 |

FOREIGN PATENT DOCUMENTS

| | | |
|---|---|---|
| CN | 102618312 A | 8/2012 |
| CN | 105907407 A | 8/2016 |
| CN | 106431802 A | 2/2017 |
| CN | 106811228 A | 6/2017 |
| CN | 109370632 A | 2/2019 |
| CN | 110713843 A | 1/2020 |
| EP | 3693441 A1 | 8/2020 |
| JP | S54127403 A | 10/1979 |

OTHER PUBLICATIONS

Mei et al., "Correlation between Persistent Free Radicals of Biochar and Bio-oil Yield at Different Pyrolysis Temperatures," Jan. 8, 2020, BioResources vol. 15 No. 1, pp. 1384-1396, 13 pages.
Liu et al., "Synergistic Effect of Co-pyrolysis of Biomass and Plastics," Jun. 30, 2019, Chemistry and Industry of Forest Products, vol. 39 No. 3, pp. 34-42, 9 pages.
Nan, "Fast Pyrolysis Liquefaction of Oil Crops Straw and Quality Evaluation on Bio-oil," Feb. 15, 2009, Huazhong Agricultural University, 80 pages.
Yang, "Environmentally Persistent Free Radical Generation and Mechanism during the Pyrolysis of Biomasses," Feb. 15, 2017, Kunming University of Science and Technology, 82 pages.
Liu, "Radical Chemistry in the Pyrolysis of Heavy Organics," Sep. 20, 2018, Journal of Beijing University of Chemical Technology (Natural Science) vol. 45, No. 5, 18 pages.
Fan, "Bio-oil from fast pyrolysis of lignin: Effects of process and upgrading parameters," May 21, 2017, Bioresource Technology, 35 pages.

* cited by examiner

Primary Examiner — Jay Patidar
(74) Attorney, Agent, or Firm — Muncy, Geissler, Olds & Lowe, P.C.

(57) ABSTRACT

The present invention discloses a rapid evaluation method for quality of lignin-pyrolyzed bio-oil and an application thereof, and particularly relates to a rapid evaluation method for quality of lignin-pyrolyzed bio-oil based on radical detection and an application thereof. The method can be used to evaluate the quality of lignin-pyrolyzed bio-oil by detecting the spin concentration of radicals in lignin char obtained by lignin pyrolysis, thus avoiding the complex processes involved in the evaluation for the quality of conventional pyrolyzed bio-oils such as, extraction, separation and detection and reducing the detection costs substantially. The detection method of the present invention is simple and easy to operate, thus achieving the rapid evaluation for the quality of lignin-pyrolyzed bio-oil. Moreover, the detection method of the present invention is non-contact detection without destructive samples, which is applicable to the rapid detection on the quality of lignin-pyrolyzed bio-oil in the field of industry and scientific research. The present invention further broadens the application fields of radical detection and contributes to the development of radical detection technology in the field of pyrolysis, and provides a reliable method for the detection of lignin-pyrolyzed bio-oil, which has good application prospect.

9 Claims, No Drawings

RAPID EVALUATION METHOD FOR QUALITY OF LIGNIN-PYROLYZED BIO-OIL BASED ON RADICAL DETECTION AND APPLICATION THEREOF

FIELD OF TECHNOLOGY

The present invention belongs to the field of new energy resources and relates to a rapid evaluation method for quality of lignin-pyrolyzed bio-oil based on radical detection and an application thereof.

BACKGROUND

Lignin is one of the three components of lignocellulosic biomass, and it is the only one renewable natural aromatic resource and capable of substituting fossil resources to produce aromatic compounds. It is of great importance to transform lignin into high value-added chemicals and renewable synthetic fuels, which has been extensively concerned all over the world. Pyrolysis is an effective method to transform lignin into high value-added chemicals and renewable synthetic fuels. However, due to complex structure and high oxygen content of lignin, the obtained lignin-pyrolyzed bio-oil has poor quality. As a hydrogen donor, plastic can effectively improve the quality of lignin-pyrolyzed bio-oil during the co-pyrolysis with lignin. Patents CN109370632A and CN106431802A relate to preparation of high-quality pyrolytic bio-oil by co-pyrolysis of lignin and plastic. However, the lignin-pyrolyzed bio-oil obtained via co-pyrolysis with plastic still has very complex components; and these components can be divided into an aqueous phase component, a light oil component and a heavy oil component; and each component contains hundreds of chemical substances. The evaluation on the quality of lignin-pyrolyzed bio-oil always involves in complex steps, such as extraction, separation and detection. Moreover, the extraction process is related to multiple toxic reagents; and the complex lignin-pyrolyzed bio-oil components need to be simultaneously detected by multiple sets of experimental facilities; therefore, the evaluation has complicated operation and high costs. Therefore, it is urgent to develop a rapid and cheap evaluation method for the quality of lignin-pyrolyzed bio-oil.

SUMMARY

In view of the above problems, the present invention provides a rapid evaluation method for quality of lignin-pyrolyzed bio-oil, and in particular to a rapid evaluation method for quality of lignin-pyrolyzed bio-oil based on radical detection. The method can be used to evaluate the quality of lignin-pyrolyzed bio-oil obtained by co-pyrolysis of lignin and different plastics by determining the spin concentration of radicals in lignin-pyrolyzed char rapidly.

Another objective of the present invention is to provide an application of the above rapid evaluation method for quality of lignin-pyrolyzed bio-oil based on radical detection in the rapid detection on the quality of lignin-pyrolyzed bio-oil.

Technical solutions of the present invention are as follows:

A rapid evaluation method for quality of lignin-pyrolyzed bio-oil based on radical detection includes steps of:

pyrolyzing lignin to prepare a lignin char;

detecting a spin concentration of radicals in the lignin char;

and evaluating quality of a bio-oil derived from lignin pyrolysis according to the spin concentration of radicals.

Further, the rapid evaluation method is applied to the rapid detection on the quality of lignin-pyrolyzed bio-oil.

The present invention has the following beneficial effects: (1), the method can be used to evaluate the quality of lignin-pyrolyzed bio-oil by detecting the spin concentration of radicals in lignin char obtained by co-pyrolysis of lignin and plastic, thus avoiding the complex processes involved in the evaluation for the quality of conventional bio-oils such as, extraction, separation and detection and reducing the detection costs substantially; (2), the detection method of the present invention is simple and easy to operate, thus achieving the rapid evaluation for the quality of lignin-pyrolyzed bio-oil; moreover, the detection method of the present invention is non-contact detection without destructive samples, which is applicable to the rapid detection on the quality of lignin-pyrolyzed bio-oil in the field of industry and scientific research; (3), the present invention further broadens the application fields of radical detection and contributes to the development of radical detection technology in the field of pyrolysis, and provides a reliable method for the detection of lignin-pyrolyzed bio-oil, which has good application prospect.

DESCRIPTION OF THE EMBODIMENTS

To describe the technical solutions of the present invention more clearly, the present invention will be further described hereafter. Apparently, what is described below are merely a portion of the embodiments. A person skilled in the art can further apply these technical solutions of the present invention to other similar situations without any inventive effort. To describe the technical solutions of the present invention more clearly, the technical solutions of the present invention will be further described below:

The rapid evaluation method for the quality of lignin-pyrolyzed bio-oil of the present invention may be used to evaluate the quality of lignin-pyrolyzed bio-oil obtained by co-pyrolysis of lignin and different plastics by detecting the spin concentration of radicals in lignin-pyrolyzed char rapidly.

The rapid evaluation method for the quality of lignin-pyrolyzed bio-oil of the present invention has the following specific steps:

1. Preparation of a Lignin Char:

(1.1) Lignin and plastic were placed into a material area of a pyrolysis reactor in a certain mass ratio and according to certain placement mode; in the step, the lignin was one of native lignin, industrial lignin and laboratory-prepared lignin. The plastic was at least one of polyethylene, polyvinyl chloride, polypropylene, acrylonitrile-butadiene-styrene copolymer, polyethylene terephthalate, polystyrene and polymethyl methacrylate. The placement mode of the lignin and the plastic was one of mechanical blending, contact-type layered placement and non-contact layered placement. The mass ratio of the lignin to the plastic ranges from (0.1-10):1.

(1.2) The pyrolysis reactor was sealed and purged with an inert gas until the pyrolysis reactor was filled with the inert gas, and then the pyrolysis reactor was turned on and heated up to a preset temperature, in the step, the inert gas was one of nitrogen gas, helium gas, neon gas and argon gas.

(1.3) After the temperature of the pyrolysis reactor was stabilized at the preset temperature, the lignin and the plastic were put to the pyrolysis area and pyrolyzed for a certain time; in the step, the co-pyrolysis temperature of the lignin and the plastic was 300-1200° C. and the pyrolysis time was 10 s-1 h.

(1.4) At the end of the pyrolysis, the solid product derived from the lignin pyrolysis was collected and washed with an organic solvent to remove the adhered bio-oil, and dried to obtain the lignin char; in the step, the organic solvent used for washing the solid product derived from the lignin pyrolysis was at least one of methyl alcohol, ethyl alcohol, propyl alcohol, isopropyl alcohol, acetone, diethyl ether, ethyl acetate, n-hexane, benzene, methylbenzene, tetrachloromethane, trichloromethane, dichloromethane, N,N-dimethyl formamide, dimethyl sulfoxide and 1,4-dioxane.

2. Detection on a spin concentration of radicals in the lignin char;

The lignin char was ground to a certain grain size and put to a quartz tube, and the spin concentration of radicals was detected by an electron paramagnetic resonance spectrometer. The lignin char has a grain size less than 0.5 mm.

3. The quality of the bio-oil pyrolyzed by lignin was evaluated according to the spin concentration of radicals. The lower the spin concentration of radicals is, the higher the quality of the lignin-pyrolyzed bio-oil is.

An application of the rapid evaluation method for quality of lignin-pyrolyzed bio-oil of the present invention in the rapid detection on the quality of lignin-pyrolyzed bio-oil is provided.

During the implementation of the following examples, the bio-oil adhered on the surface of the solid product derived from lignin pyrolysis may be washed by methyl alcohol, ethyl alcohol, propyl alcohol, isopropyl alcohol, acetone, diethyl ether, ethyl acetate, n-hexane, benzene, methylbenzene, tetrachloromethane, trichloromethane, dichloromethane, N,N-dimethyl formamide, dimethyl sulfoxide and 1,4-dioxane; the volume and the washing times of the organic solvent used were different only. Therefore, types, volume and washing times of the organic solvent used are not definitely mentioned in the implementation of the detailed examples.

In the implementation of the following examples, after being ground, the lignin char has a grain size less than 0.5 mm as long as it can be put to a quartz tube. The grain size of the lignin char has no impact on the spin concentration of radicals detected by the EPR spectrometer. Therefore, the grain size of the ground lignin char is not definitely mentioned in the implementation of the detailed examples.

The quality of the lignin-pyrolyzed bio-oil is evaluated mainly by a monomer yield; the higher the monomer yield of the detectable lignin-pyrolyzed bio-oil is, the better the quality of the lignin-pyrolyzed bio-oil is. Therefore, during the implementation of the detailed examples, GC-MS is used to detect the overall yield of detectable matters in the lignin-pyrolyzed bio-oil and used to represent the quality of the lignin-pyrolyzed bio-oil.

Example 1

1 g lignin from corncob bioethanol residue and 1 g polyethylene were placed to a material area of a pyrolysis reactor in a contact layered placement mode, and after the pyrolysis reactor was sealed, high-purity nitrogen gas was used for replacement until the pyrolysis reactor was filled with nitrogen gas; when the temperature of the pyrolysis reactor was stabilized at 550° C., the sample was rapidly pushed into the pyrolysis area and was pyrolyzed for 10 min; at the end of the pyrolysis, the sample was pulled back to the material area and cooled to room temperature under the protection of nitrogen gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.19 \times 10^{19}$ spins/g by an EPR spectrometer; meanwhile, the total content of detectable matters in the lignin-pyrolyzed bio-oil was determined to be $6.24 \times 10^9$ area/mg by GC-MS.

In the same condition, the spin concentration of radicals in the lignin char obtained by independent pyrolysis of 1 g lignin from corncob bioethanol residue was $2.64 \times 10^{19}$ spins/g; and the total content of detectable matters in the bio-oil was $5.72 \times 10^9$ area/mg.

The above comparison indicates that after being co-pyrolyzed with polyethylene in a contact layered placement way, the lignin char has reduced spin concentration of radicals and improved quality of bio-oil obtained.

Example 2

1 g lignin from corncob bioethanol residue and 1 g polyethylene were placed to a material area of a pyrolysis reactor in a mechanical blending mode, and after the pyrolysis reactor was sealed, high-purity nitrogen gas was used for replacement until the pyrolysis reactor was filled with nitrogen gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of nitrogen gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.97 \times 10^{19}$ spins/g by an EPR spectrometer; meanwhile, the total content of detectable matters in the lignin-pyrolyzed bio-oil was determined to be $5.49 \times 10^9$ area/mg by GC-MS.

In the same condition, the spin concentration of radicals in the lignin char obtained by independent pyrolysis of 1 g lignin from corncob bioethanol residue was $2.64 \times 10^{19}$ spins/g; and the total content of detectable matters in the bio-oil was $5.72 \times 10^9$ area/mg.

The above comparison indicates that after being co-pyrolyzed with polyethylene in a mechanical blending way, the lignin char has increased spin concentration of radicals and reduced quality of bio-oil obtained.

Example 3

1 g lignin from corncob bioethanol residue and 1 g polyethylene were placed to a material area of a pyrolysis reactor in a non-contact layered placement mode, and after the pyrolysis reactor was sealed, high-purity nitrogen gas was used for replacement until the pyrolysis reactor was filled with nitrogen gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of nitrogen gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.07 \times 10^{19}$ spins/g by an EPR spectrometer; meanwhile, the total content of detectable matters in the lignin-pyrolyzed bio-oil was determined to be $6.41 \times 10^9$ area/mg by GC-MS.

In the same condition, the spin concentration of radicals in the lignin char obtained by independent pyrolysis of 1 g lignin from corncob bioethanol residue was $2.64 \times 10^{19}$ spins/g; and the total content of detectable matters in the bio-oil was $5.72 \times 10^9$ area/mg.

The above comparison indicates that after being co-pyrolyzed with polyethylene in a non-contact layered placement way, the lignin char has reduced spin concentration of radicals and improved quality of bio-oil obtained.

Example 4

1 g industrial lignin and 1 g polypropylene were placed to a material area of a pyrolysis reactor in a contact layered placement mode, and after the pyrolysis reactor was sealed, high-purity helium gas was used for replacement until the pyrolysis reactor was filled with helium gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of helium gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.13 \times 10^{19}$ spins/g by an EPR spectrometer; meanwhile, the total content of detectable matters in the lignin-pyrolyzed bio-oil was determined to be $6.30 \times 10^{19}$ area/mg by GC-MS.

In the same condition, the spin concentration of radicals in the lignin char obtained by independent pyrolysis of 1 g industrial lignin was $2.60 \times 10^{19}$ spins/g; and the total content of detectable matters in the bio-oil was $5.79 \times 10^9$ area/mg.

The above comparison indicates that after being co-pyrolyzed with polypropylene in a contact layered placement way, the lignin char has reduced spin concentration of radicals and improved quality of bio-oil obtained.

Example 5

1 g milled wood lignin and 1 g polyvinyl chloride were placed to a material area of a pyrolysis reactor in a contact layered placement mode, and after the pyrolysis reactor was sealed, high-purity helium gas was used for replacement until the pyrolysis reactor was filled with helium gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of helium gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.23 \times 10^{19}$ spins/g by an EPR spectrometer; meanwhile, the total content of detectable matters in the lignin-pyrolyzed bio-oil was determined to be $6.19 \times 10^9$ area/mg by GC-MS.

In the same condition, the spin concentration of radicals in the lignin char obtained by independent pyrolysis of 1 g milled wood lignin was $2.69 \times 10^{19}$ spins/g; and the total content of detectable matters in the bio-oil was $5.68 \times 10^9$ area/mg.

The above comparison indicates that after being co-pyrolyzed with polyvinyl chloride in a contact layered placement way, the lignin char has reduced spin concentration of radicals and improved quality of bio-oil obtained.

Example 6

1 g alkali lignin and 1 g acrylonitrile-butadiene-styrene copolymer were placed to a material area of a pyrolysis reactor in a contact layered placement mode, and after the pyrolysis reactor was sealed, high-purity neon gas was used for replacement until the pyrolysis reactor was filled with neon gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of neon gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.72 \times 10^{19}$ spins/g by an EPR spectrometer; meanwhile, the total content of detectable matters in the lignin-pyrolyzed bio-oil was determined to be $5.84 \times 10^9$ area/mg by GC-MS.

In the same condition, the spin concentration of radicals in the lignin char obtained by independent pyrolysis of 1 g alkali lignin was $2.57 \times 10^9$ spins/g; and the total content of detectable matters in the bio-oil was $5.89 \times 10^9$ area/mg.

The above comparison indicates that after being co-pyrolyzed with acrylonitrile-butadiene-styrene copolymer in a contact layered placement way, the lignin char has increased spin concentration of radicals and reduced quality of bio-oil obtained.

Example 7

1 g acid lignin and 1 g polyethylene terephthalate were placed to a material area of a pyrolysis reactor in a contact layered placement mode, and after the pyrolysis reactor was sealed, high-purity argon gas was used for replacement until the pyrolysis reactor was filled with argon gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of argon gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.85 \times 10^{19}$ spins/g by an EPR spectrometer; meanwhile, the total content of detectable matters in the lignin-pyrolyzed bio-oil was determined to be $5.61 \times 10^9$ area/mg by GC-MS.

In the same condition, the spin concentration of radicals in the lignin char obtained by independent pyrolysis of 1 g acid lignin was $2.78 \times 10^{19}$ spins/g; and the total content of detectable matters in the bio-oil was $5.77 \times 10^9$ area/mg.

The above comparison indicates that after being co-pyrolyzed with polyethylene terephthalate in a contact layered placement way, the lignin char has increased spin concentration of radicals and reduced quality of bio-oil obtained.

Example 8

1 g enzymatic hydrolysis lignin and 1 g polystyrene were placed to a material area of a pyrolysis reactor in a contact layered placement mode, and after the pyrolysis reactor was sealed, high-purity argon gas was used for replacement until the pyrolysis reactor was filled with argon gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of argon gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.75 \times 10^{19}$ spins/g by an EPR spectrometer; meanwhile, the total content of detectable matters in the lignin-pyrolyzed bio-oil was determined to be $5.76 \times 10^9$ area/mg by GC-MS.

In the same condition, the spin concentration of radicals in the lignin char obtained by independent pyrolysis of 1 g enzymatic hydrolysis lignin was $2.67 \times 10^{19}$ spins/g; and the total content of detectable matters in the bio-oil was $5.80 \times 10^9$ area/mg.

The above comparison indicates that after being co-pyrolyzed with polystyrene in a contact layered placement way, the lignin char has increased spin concentration of radicals and reduced quality of bio-oil obtained.

Example 9

1 g organosolv lignin and 1 g polymethyl methacrylate were placed to a material area of a pyrolysis reactor in a contact layered placement mode, and after the pyrolysis reactor was sealed, high-purity argon gas was used for replacement until the pyrolysis reactor was filled with argon gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of argon gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.85 \cdot 10^{19}$ spins/g by an EPR spectrometer; meanwhile, the total content of detectable matters in the lignin-pyrolyzed bio-oil was determined to be $5.65 \times 10^9$ area/mg by GC-MS.

In the same condition, the spin concentration of radicals in the lignin char obtained by independent pyrolysis of 1 g organosolv lignin was $2.61 \times 10^{19}$ spins/g; and the total content of detectable matters in the bio-oil was $5.87 \times 10^9$ area/mg.

The above comparison indicates that after being co-pyrolyzed with polymethyl methacrylate in a contact layered placement way, the lignin char has increased spin concentration of radicals and reduced quality of bio-oil obtained.

Example 10

0.1 g lignin from corncob bioethanol residue and 1 g polyethylene were placed to a material area of a pyrolysis reactor in a contact layered placement mode, and after the pyrolysis reactor was sealed, high-purity nitrogen gas was used for replacement until the pyrolysis reactor was filled with nitrogen gas; when the temperature of the pyrolysis reactor was stabilized at 550° C., the sample was rapidly pushed into the pyrolysis area and pyrolyzed for 10 min; at the end of the pyrolysis, the sample was pulled back to the material area and cooled to room temperature under the protection of nitrogen gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $2.1 Ox 10^{19}$ spins/g by an EPR spectrometer; meanwhile, the total content of detectable matters in the lignin-pyrolyzed bio-oil was determined to be $6.39 \times 10^9$ area/mg by GC-MS.

In the same condition, the spin concentration of radicals in the lignin char obtained by independent pyrolysis of 1 g lignin from corncob bioethanol residue was $2.64 \times 10^{19}$ spins/g; and the total content of detectable matters in the bio-oil was $5.72 \times 10^9$ area/mg.

The above comparison indicates that after being co-pyrolyzed by increasing the mixing ratio of polyethylene, the lignin char has reduced spin concentration of radicals and improved quality of bio-oil obtained.

Example 11

1 g lignin from corncob bioethanol residue and 1 g polyethylene were placed to a material area of a pyrolysis reactor in a contact layered placement mode, and after the pyrolysis reactor was sealed, high-purity nitrogen gas was used for replacement until the pyrolysis reactor was filled with nitrogen gas; w % ben the temperature of the pyrolysis reactor was stabilized at 1200° C., the sample was rapidly pushed into the pyrolysis area and pyrolyzed for 1 h; at the end of the pyrolysis, the sample was pulled back to the material area and cooled to room temperature under the protection of nitrogen gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $3.69 \times 10^{19}$ spins/g by an EPR spectrometer; meanwhile, the total content of detectable matters in the lignin-pyrolyzed bio-oil was determined to be $4.66 \times 10^9$ area/mg by GC-MS.

In the same condition, the spin concentration of radicals in the lignin char obtained by independent pyrolysis of 1 g lignin from corncob bioethanol residue was $2.64 \times 10^{19}$ spins/g; and the total content of detectable matters in the bio-oil was $5.72 \times 10^9$ area/mg.

The above comparison indicates that after the co-pyrolysis temperature is increased, the lignin char has increased spin concentration of radicals and reduced quality of bio-oil obtained.

Example 12

1 g lignin from corncob bioethanol residue and 1 g polyethylene were placed to a material area of a pyrolysis reactor in a contact layered placement mode, and after the pyrolysis reactor was sealed, high-purity nitrogen gas was used for replacement until the pyrolysis reactor was filled with nitrogen gas; when the temperature of the pyrolysis reactor was stabilized at 300° C., the sample was rapidly pushed into the pyrolysis area and pyrolyzed for 10 s; at the end of the pyrolysis, the sample was pulled back to the material area and cooled to room temperature under the protection of nitrogen gas; the pyrolyzed solid product was transferred to a beaker, and an organic solvent was taken to wash the adhered bio-oil, and then dried to obtain the lignin char; then the lignin char was ground to be less than 0.5 mm and put to a quartz tube; the spin concentration of radicals was determined to be $1.69 \times 10^{19}$ spins/g by an EPR spectrometer; meanwhile, the total content of detectable matters in the lignin-pyrolyzed bio-oil was determined to be $6.97 \times 10^9$ area/mg by GC-MS.

In the same condition, the spin concentration of radicals in the lignin char obtained by independent pyrolysis of 1 g lignin from corncob bioethanol residue was $2.64 \times 10^{19}$ spins/g; and the total content of detectable matters in the bio-oil was $5.72 \cdot 10^9$ area/mg.

The above comparison indicates that after being co-pyrolyzed by increasing the mixing ratio of polyethylene, the lignin char has reduced spin concentration of radicals and improved quality of bio-oil obtained.

Moreover, the treatment elements and orders of sequences, use of digital alphabet, or use of other names in the present invention shall be not construed as limiting the order of the process and method of the present application, unless otherwise specified in the claims. Even though the above disclosure has discussed some embodiments of invention considered to be useful at present via various examples, it should be understood that such kind of details are only for the purpose of description; and the appended claims are not only limited to the examples disclosed herein. On the contrary, claims are aimed at covering all the amendments and equivalent combinations within the essence and scope of the embodiments of the present application. For example, although the system component described above may be achieved by the hardware equipment, the system component may be also achieved via a solution of software, e.g., the system described is mounted on an existing server or mobile device.

Finally, it should be understood that the examples in the present invention are merely used to describe the principle of the embodiments of the present invention; and other transformations may also fall into the scope of the present invention. Therefore, as an example but not a limitation, alternative configurations of the embodiments of the present invention may be regarded to be consistent with the technical teachings of the present invention. Accordingly, embodiments of the present invention are not limited to the examples introduced and described in the present invention definitely.

The invention claimed is:

1. A rapid evaluation method for quality of lignin-pyrolyzed bio-oil based on radical detection, comprising steps of:
   pyrolyzing lignin to prepare a lignin char;
   detecting a spin concentration of radicals in the lignin char;
   and evaluating quality of a lignin-pyrolyzed bio-oil according to the spin concentration of radicals; wherein the lower the spin concentration of radicals is, the better the quality of the lignin-pyrolyzed bio-oil is; the quality of the lignin-pyrolyzed bio-oil is capable of being represented by detecting a monomer yield of the lignin-pyrolyzed bio-oil, and the higher the monomer yield of the lignin-pyrolyzed bio-oil is, the better the quality of the lignin-pyrolyzed big-oil is;
   wherein the method for preparing the lignin char comprises steps of:
   placing the detected lignin and plastic with a mass ratio to a material area of a pyrolysis reactor;
   sealing the pyrolysis reactor and purging with an inert gas until the pyrolysis reactor is filled with the inert gas, and then turning on the pyrolysis reactor and heating up to a preset temperature;
   putting the lignin and the plastic to a pyrolysis area for pyrolysis after the pyrolysis reactor is stabilized at the preset temperature; and
   at the end of the pyrolysis, collecting a solid product derived from the lignin pyrolysis and washing to remove adhered bio-oil with an organic solvent, and performing drying to obtain the lignin char.

2. The evaluation method according to claim 1, wherein the method for detecting the spin concentration of radicals in the lignin char comprises:
   grinding the lignin char to a powder having a grain size less than 0.5 mm, and then detecting a spin concentration of radicals in the powder.

3. The evaluation method according to claim 2, wherein the method for detecting the spin concentration of radicals in the powder comprises: putting the ground lignin char powder having a grain size less than 0.5 mm to a quartz tube, and detecting the spin concentration of radicals by an electron paramagnetic resonance spectrometer.

4. The evaluation method according to claim 1, wherein the placement mode of the lignin and the plastic is one of mechanical blending, contact-type layered placement and non-contact layered placement.

5. The evaluation method according to claim 1, wherein the mass ratio of the lignin to the plastic ranges from (0.1-10):1.

6. The evaluation method according to claim 1, wherein the lignin and the plastic are co-pyrolyzed at 300-1200° C. and the pyrolysis time is 10 s-1 h.

7. The evaluation method according to claim 1, wherein the organic solvent used for washing the solid product derived from the lignin pyrolysis is at least one of methyl alcohol, ethyl alcohol, propyl alcohol, isopropyl alcohol, acetone, diethyl ether, ethyl acetate, n-hexane, benzene, methylbenzene, tetrachloromethane, trichloromethane, dichloromethane, N,N-dimethyl formamide, dimethyl sulfoxide and 1,4-dioxane.

8. The evaluation method according to claim 1, wherein the lignin is one of native lignin, industrial lignin or laboratory-prepared lignin; the plastic is at least one of polyethylene, polyvinyl chloride, polypropylene, acrylonitrile-butadiene-styrene copolymer, polyethylene terephthalate, polystyrene and polymethyl methacrylate.

9. An application of the rapid evaluation method for quality of lignin-pyrolyzed bio-oil based on radical detection of claim 1 in the rapid evaluation for the quality of bio-oil pyrolyzed by lignin.

* * * * *